United States Patent Office 3,319,794
Patented May 16, 1967

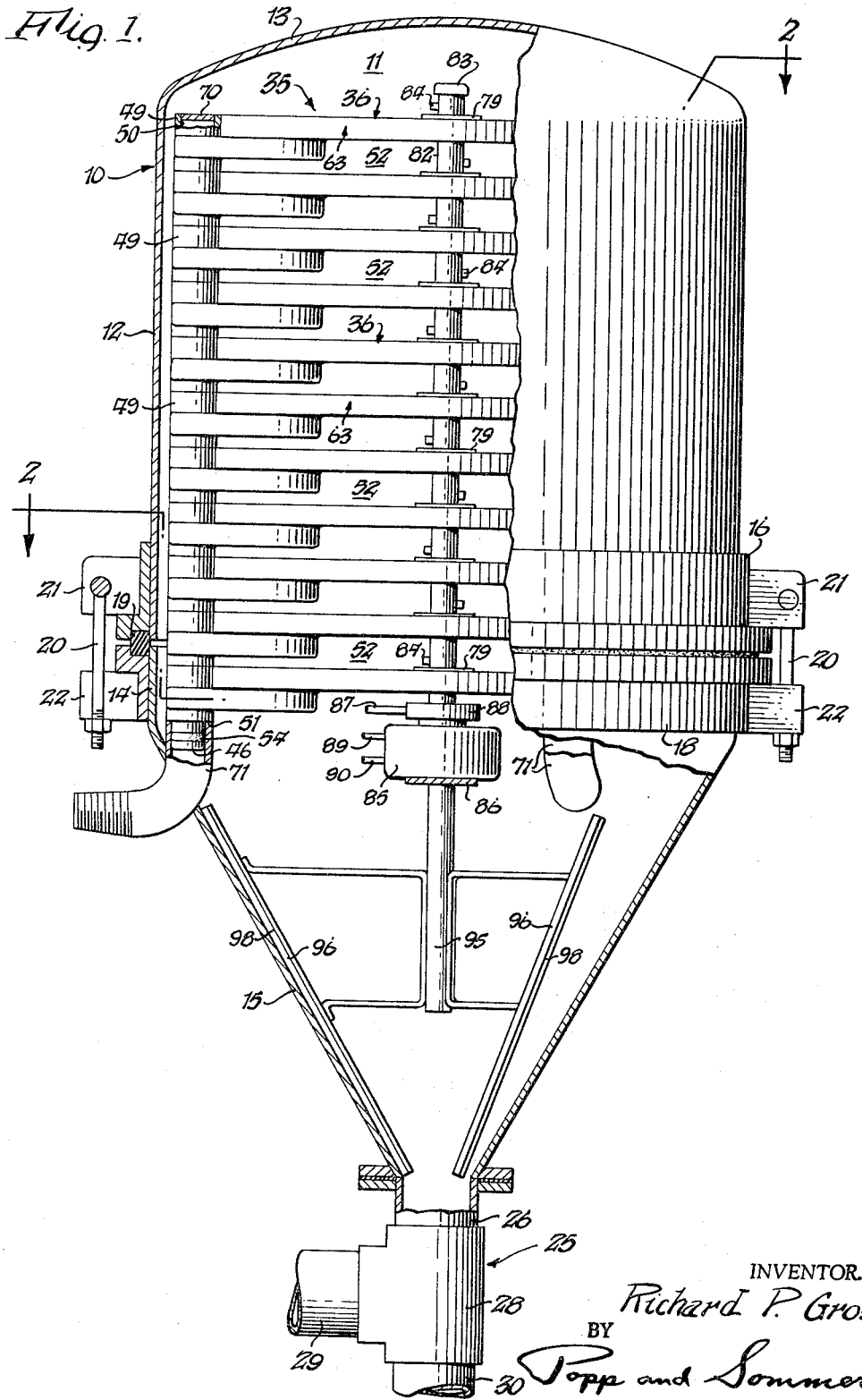

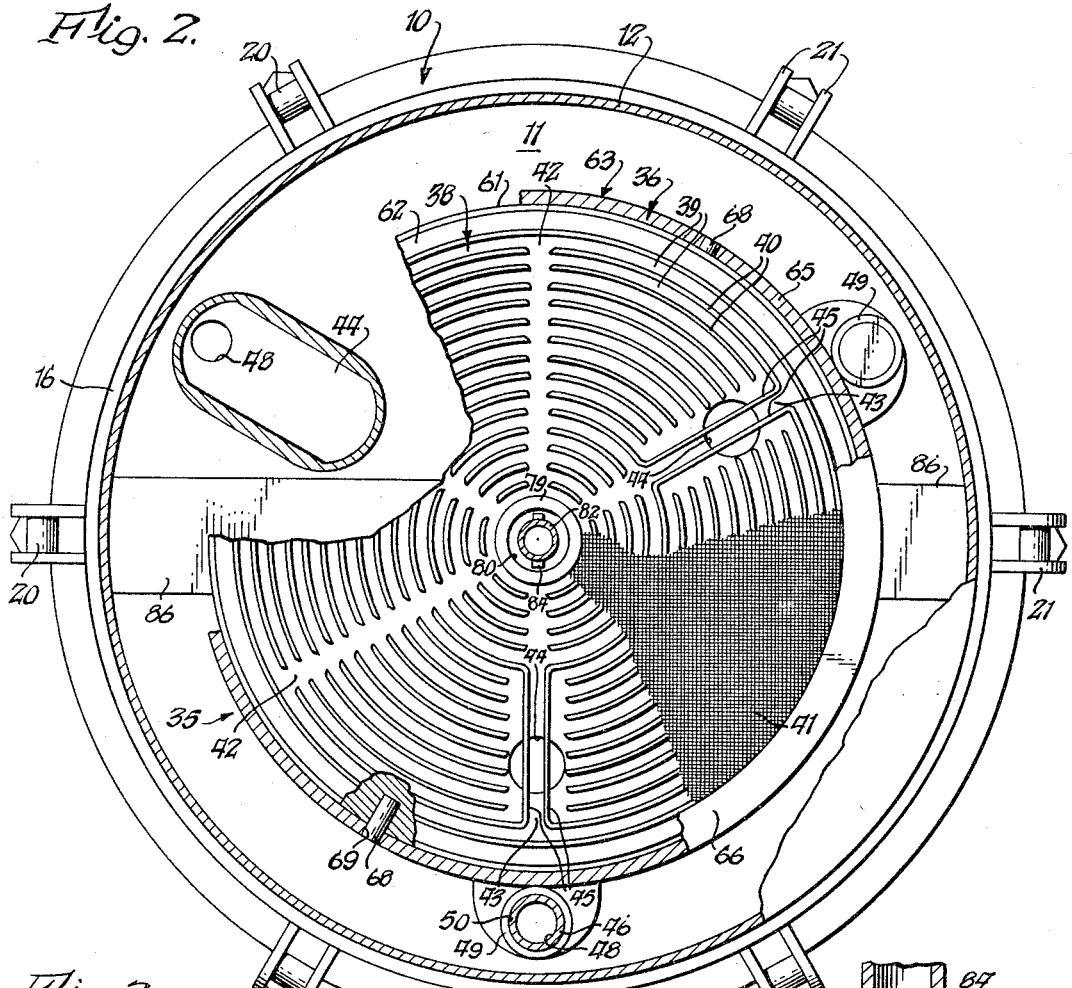
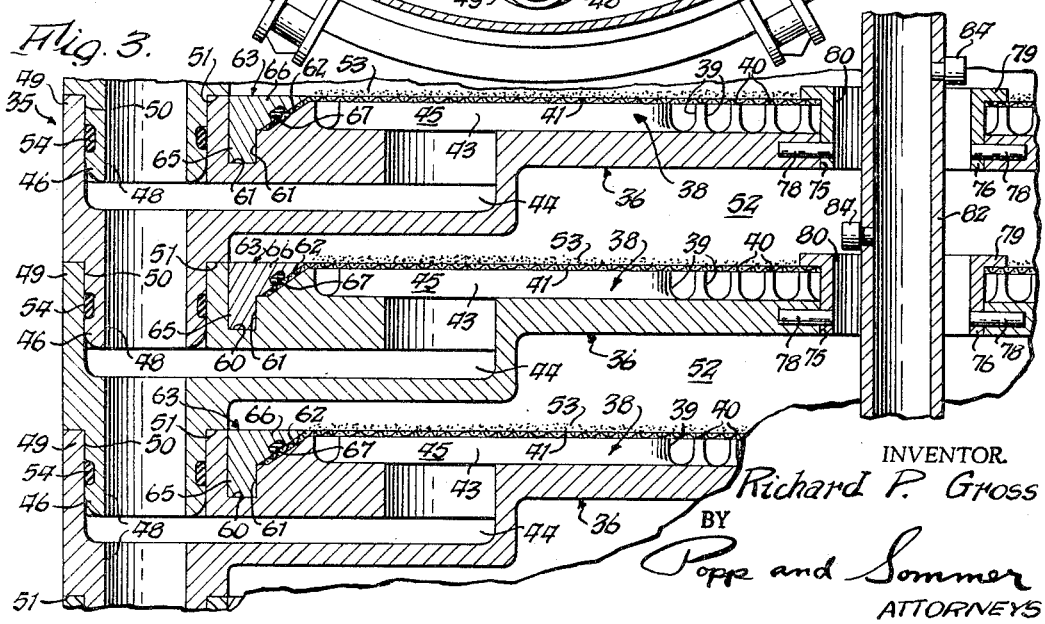

3,319,794
HORIZONTAL PLATE FILTER
Richard P. Gross, 611 Cornwall Ave.,
Tonawanda, N.Y. 14150
Filed Oct. 23, 1965, Ser. No. 503,515
13 Claims. (Cl. 210—334)

This invention relates to a horizontal plate filter, that is, one comprising a stack of horizontal plates in a shell which have cavities in their upper sides covered with a filter cloth in turn having its top face coated with a filter cake, say, of diatomaceous earth, the liquid to be filtered being introduced into the shell around the plates and the filtrate being removed from the plate cavities.

Such horizontal plate filters represent a distinct class inasmuch as the flow of liquid to be filtered can be stopped without rendering the filter inoperative. This is because the filter cake remains adhered to the top surface of the filter cloths ready to resume filtering action when the liquid flow is again started. In contrast, in a vertical plate filter, the cake of diatomaceous earth falls by gravity to the bottom of the filter when the flow stops and the filter cloths must be recoated before the flow of liquid is again started. Considering that a few minutes of power failure could cause such stopping of the flow, it will be appreciated that a long shut down can occur with vertical plate filters due to the necessity of recoating them and also possibly removing the fallen filter cake. Also while tubular filters have a high flow rate due to minimum impedance, tubular filters suffer the same disadvantage, regardless of how arranged, that the filter cake can fall off the filter cloth by gravity even on short, accidental shut down.

The principal object of the present invention is to provide a horizontal plate filter with minimum impedance to flow of the liquid in process, and hence low pressure drop across the filter, the low impedance being comparable to tubular filters; the use of plates permitting a high ratio of filter cloth area to volumetric size of the filter, and the horizontal arrangement of the plates, with the filter cloths on top, permitting stopping and starting operation without disturbing the filter cake on the cloths. This low impedance is obtained by having the spaces between the plates open their full height, substantially all around the periphery of the stack of plates, the only barriers at the rims of the plates being a plurality of nipples and sockets connecting their cavities and these being preferably arranged outboard of the major plate rim surfaces. This low impedance is continued on the filtrate side of the filter by the employment of a plurality of such nipples and sockets uniformly spaced around the plate rims so that the filtrate can quickly find its way thereto.

Another object is to provide such a horizontal plate filter of low flow impedance in which the flow of the filtrate from the filter cloth is substantially uniform from all areas of the filter cloth, so that all of the filter cloth area is used to substantially the same degree and the liquid cannot short circuit through parts of the filter cloth close to the outlet nipples.

Another aim is to provide such a horizontal plate filter in which the liquid pressure holds the stack of plates together so that no hold downs or clamps are required for this purpose. This hydraulic hold down is due to the external pressure being higher than the internal pressure on the plates.

Another object is to permit of the use of plates and in which all mating surfaces thereof do not require precision fits, liquid sealing rings being provided to prevent leakage of unfiltered liquid into the filtrate past any such mating surfaces.

Another object is to provide such a horizontal leaf filter which can be easily manually cleaned on removing the dome part of the enclosing shell, the spaces between the plates being open, full height, almost all the way around the stack so that the loaded filter cake can be manually brushed from the cloths. Such manual cleaning avoids breaking the seals between plates but, if required, the plates can be easily removed, one by one, from the stack for any required replacement.

Another aim is to provide such a horizontal plate filter which is equipped with an air jet cleaner, cleaning merely requiring draining and turning on air pressure.

Another aim is to insure against loaded filter cake dust, so removed by air jets, lodging in the bottom of the filter, a rotary scraper being provided to prevent this.

In the accompanying drawings, FIGS. 1 is a vertical section, partly in elevation, of a horizontal plate filter embodying the present invention. FIG. 2 is a horizontal section taken generally on line 2—2, FIGS. 1. FIG. 3 is an enlarged fragmentary vertical section through the stack of filter plates.

The horizontal plate filter of the present invention is contained in an upright shell 10 forming a chamber 11, this shell being in the form of an upper cylinder 12 having an upper end head 13 and a bottom cylinder 14 having a bottom conical end head 15. At their meeting edges these shells have fixed thereto external clamping rings 16 and 18, a sealing gasket 19 being interposed between these clamping rings, and these clamping rings being drawn together by swing bolts 20 journalled between ears 21 on the top clamping ring 16 and swinging between ears 22 on the bottom clamping ring 18.

An inlet 25 for the liquid to be filtered is provided at the bottom of the conical end head 15, this being in the form of an inlet pipe 26 connected to a T 28 supplied with liquid to be filtered from a horizontal inlet pipe 29 and connecting with a vertical bottom drain pipe 30.

A stack 35 of generally counterpart horizontal metal plates 36 are arranged in the chamber 11. Each of these plates is recessed over the greater part of its top area to provide an upwardly facing cavity 38.

Desirably each of these cavities 38 is in the form of a series of concentric arcuate collecting grooves 39 between ridges which provide lands 40 for supporting a filter cloth 41. These arcuate collecting grooves 39 connect with and drain into radial grooves 42 and 43, the latter leading to a conduit 44 of which three are provided in uniformly spaced relation around the periphery of each plate. Preferably the three radial grooves 43 are flanked by radial ridges 45 to prevent short circuiting of the filtrate from the adjacent marginal parts of the filter cloth directly to the conduits 44.

In line and communicating with each of the conduits 44 each plate is provided with a vertical nipple 46 projecting downwardly therefrom and providing an opening 48 to the exterior of the plate. Each plate is also provided in line and communicating with each conduit 44 with a socket 49 providing top openings 50 to the exterior of the plate and receiving a companion nipple 46 of the next higher adjacent plate 36. The nipples 46 are provided with shoulders 51 which hold the plates 36 in vertically spaced relation to one another to provide horizontal spaces 52 therebetween which are open to the chamber 11 substantially their full height around the greater part of the peripheries of these plates so as to minimize impedance to cleaning filter cake 53 from the tops of the cloths 41 and to the flow of the liquid to be filtered from the chamber 11 into these spaces 52 between these plates. Preferably flexible O-rings 54, such as of rubber or neoprene, are interposed between each nipple 46 and socket 49. Preferably, as shown, the nipples 46 and sockets 49 for each plate 36 are at least three in number and project radially outwardly from the edge faces providing major portion of the rim of the plate in uniformly spaced relation to each other.

To secure each filter cloth 41 in position, each plate 36 is provided in its upper face with an endless concentric circular groove 60 arranged radially inward from the sockets 46. Each of these grooves comprises an outer deep cylindrical part 61 and a conical inner part 62 which slopes upwardly and inwardly toward the center of the plate. This groove receives a hold down ring 63 having a deep cylindrical outer part 65 and a conical inner part 66 conforming to the shape of this groove. The circular edge of each filter cloth 41 is clamped between the conical parts 62 and 66 of each groove 60 and its clamping ring 63, and preferably an O-ring 67 is provided in the conical part 66 of each clamping ring 63 to bear against the rim or edge portion of the filter cloth 41. Each clamping ring 63 can be secured in any suitable manner, preferably by pins 68 inserted in alining pin holes 69 which are in radial relation to each plate 36 and which extend inwardly from the rim thereof into its clamping ring 63.

A plug 70 blocks the openings 50 from the chamber 11 into the plate 36 at the uppermost end of the stack 35 and the nipples 46 of the plate 36 at the lowermost end of the stack fit into the upstanding ends of vertical filtrate outlet pipes 71 which extend through the conical bottom 15 of the shell 10.

To facilitate cleaning of the filter cake from the tops of the cloths 41 an air blast system is provided which is preferably constructed as follows:

Each of the plates 36 is provided axially with a vertical through bore 75 in which a collar 76 is inserted and held by radial pins 78, each collar 76 having a top flange 79 which extends over the filter cloth 41 which also is provided with an opening to receive the collar 76. The bores 80 of these collars aline with each other and contain a vertical rotary pipe 82 the upper end of which is capped, as indicated at 83. Within each chamber 52 the pipe 82 is provided with a horizontal radially projecting nozzle 84 which is positioned to direct a blast of air along the top of the filter cloth 41 so as to dry and blow away the filter cake on these cloths, together with the impurities held back by the filter cake. The pipe 82 forms the upwardly extending shaft of a pneumatic motor 85 within the bottom conical end head 15 of the shell 10 and supported by a cross bar 86. Compressed air can be supplied to the pipe 82 from a line 87 leading to the stator a slip joint 88 on top of the pneumatic motor 85. The motor 85 is shown as having air lines 89 and 90 for operating the same.

It is also desirable to scrape dry filter cake powder from the inner conical face of the bottom end head 15. To this end the motor 85 is provided with a downwardly projecting shaft 95 carrying radial blades 96 having scraping edges 98 which conform to and scrape the inner conical surface of the conical bottom end head 15, while the jets from the nozzles 84 are active, so as to prevent the lodgement of filter cake powder and impurities in the bottom end head 15.

In operation the pneumatic motor 85 is inoperative and the liquid to be filtered is introduced through the bottom inlet pipe 29 and thence through the pipe 26 into the bottom of the chamber 11 within the shell 10. This liquid to be filtered rises around the space provided between the rims of the plates 36 and the vertical walls 12, 14 of the shell 10 and enters the spaces 52 between the filter plates 36 of the stack 35. It will particularly be noted that this entry is from the peripheries of the filter plates and is unimpeded, these spaces 52 being open the full height thereof for the greater part of the length of the rims of the plates 36, being obstructed, in fact, only by the vertically projecting portions of the plates which provide the nipples 46, sockets 49 and conduits 44. Also these portions are most outboard from the plate rims.

The liquid to be filtered then passes through the filter cake 53 of, say, diatomaceous earth which has been built up on the upper surface of each filter cloth 41 into the cavity 38 provided by the concentric arcuate grooves 39. This filtered liquid then goes through the radial grooves 42 and 43 to the outlet conduits 44 and thence downwardly through the nipples 46 of each plate. These nipples are all in line with each other, as shown in FIG. 3, and hence form manifolds which lead to the outlet pipes 71 which discharge through the conical bottom head 15 of the shell 10.

The filter cake 53 is built up on each filter cloth 41 in conventional manner, being introduced with liquid to be filtered from 29 at the start of the filtering operation. When the filter cake 53 is loaded with impurities, the supply of liquid to be filtered from the line 29 is cut off and the drain line 30 opened to drain all liquid from the shell 10. The pneumatic motor 85 is then started in operation and air under pressure is supplied from line 38 through the rotary slip joint 88 into the pipe 82 which is now being rotated by the pneumatic motor 85. The air so supplied to this pipe issues as blast jets from the nozzles 84, one of these nozzles being provided in each chamber 52 and being directed against the filter cake 53 on top of each filter cloth 41. Each jet rotates so as to serve the entire circular area of each filter cloth 41 and operates to first dry loaded filter cake 53 and then blow it off the filter cloth 41, this being in the form of dust which blows out with little impedance through the open peripheral parts of the chamber 52 which, as previously stated, are open their full height around greater part of the rims of the filter plates 36 so as to offer minimum impedance to the outward discharge of the filter cake powder.

This dried, powdered, loaded filter cake falls down the space in the chamber 11 surrounding the stack 35 into the conical bottom 15. It is prevented from collecting in this bottom by the scrapers 96 which rotate with the shaft 95 and which insure the filter cake powder passing out through the vertical bottom pipe 26 into the drain line 30.

After being so cleaned, the filter is in condition for reapplication of fresh filter cake 53 and to again be placed in operation.

It will be seen that the present invention has the advantages and accomplishes the objects previously set forth particularly in providing minimum impedance to the flow of both the liquid to be filtered through the filter and also to the medium used to clean the filter which, in addition to the air system shown could be done with ordinary brushes, removing the upper part 12, 13 of the shell 10, exposing the stack 35 of filter plates 36, and since the spaces 52 between these filter plates are open their full height around practically the entire periphery of the stack, brushes (not shown) can easily be introduced into these spaces 52 and worked to physically remove the filter cake 53 on the filter cloths 41.

I claim:

1. A horizontal plate filter, comprising an upright shell forming a chamber, an inlet to said chamber for the liquid to be filtered, a stack of generally counterpart horizontal metal plates each recessed over the greater part of its top area to provide an upwardly facing cavity, a filter cloth covering each cavity, means holding each filter cloth in position, a plurality of vertical nipples projecting from each plate at spaced intervals around and near the rim thereof and providing openings to the exterior of the plate, means providing a conduit leading from each cavity to the opening in each of said nipples, socket means providing openings to the exterior of each plate and each communicating with a corresponding conduit thereof and snugly receiving a companion nipple of an adjacent plate, said nipples holding said plates in vertically spaced relation to one another to provide horizontal spaces therebetween which are open to said chamber substantially over their full height around the greater part of said rims of said plates to minimize impedance to cleaning and to the flow of said liquid to be filtered from said chamber into said space between said plates, means blocking the openings from said chamber to the plate at one end of said stack, and an outlet for the filtrate connected to each of the outlet openings from the plate at the other end of said stack.

2. A horizontal plate filter as set forth in claim 1 wherein said nipples form substantially the only obstructions in said spaces near said rims of said plates.

3. A horizontal plate filter as set forth in claim 1 wherein said inlet for the liquid to be filtered and said outlets for the filtrate are through the bottom of said shell.

4. A horizontal plate filter as set forth in claim 1 wherein each of said cavities is in the form of a series of collecting grooves providing lands for supporting said filter cloths and wherein additional grooves connect said collecting grooves with the means providing a conduit leading from each cavity to the opening in each of said nipples.

5. A horizontal plate filter as set forth in claim 1 wherein said means holding each filter cloth in position comprises a means providing an endless groove in the top face of each plate surrounding its cavity and which receives the edge of the corresponding filter cloth, an endless metal rim conforming to and fitting in said endless groove, and pins extending through each plate into its endless metal rim to hold it in position.

6. A horizontal plate filter as set forth in claim 5 wherein a flexible sealing ring fits in an annular groove in said endless rim opposing the edge of the filter cloth, said sealing ring providing a pressure seal between said filter cloth and endless rim.

7. A horizontal plate filter as set forth in claim 1 wherein a flexible O-ring provides a seal between each nipple and the opening in which its fitted.

8. The combination set forth in claim 1 wherein each group of nipples and the openings in which they are fitted are in vertical alinement with one another and with the companion outlet for the filtrate.

9. The combination set forth in claim 1 wherein each of said plates is provided at its center with a vertical through hole and means isolating said through hole from its cavity, and additionally including a vertical pipe extending through said through holes and having a discharge nozzle directed horizontally into the space between each pair of said plates, and means for supplying a cleaning fluid to said pipe to be discharged from said nozzles on top of said filter cloths to blow away any filter cake or impurities thereon.

10. The combination set forth in claim 9 wherein means are provided for rotating said pipe about its vertical axis.

11. The combination set forth in claim 10 wherein a rotary scraper blade is arranged in the bottom of said shell to rotate about a vertical axis with its edge traveling along the inner surfaces of the bottom of the shell in scraping relation thereto and wherein said scraper blade rotated through power derived from said rotating means.

12. The combination set forth in claim 1 wherein said nipples and sockets protrude beyond the surfaces providing the major portions of said rims of said plates.

13. The combination set forth in claim 1 wherein said nipples are at least three in number to reduce impedance to escape or filtrate from each of said plates.

References Cited by the Examiner

UNITED STATES PATENTS

| | | | |
|---|---|---|---|
| 1,958,394 | 5/1934 | Renfrew et al. | 210—344 |
| 2,885,082 | 5/1959 | Stafford | 210—334 |

FOREIGN PATENTS

| | | |
|---|---|---|
| 371,235 | 3/1923 | Germany. |
| 36,439 | 4/1914 | Sweden. |
| 208,183 | 4/1940 | Switzerland. |

REUBEN FRIEDMAN, *Primary Examiner.*

F. SPEAR, *Assistant Examiner.*